(12) United States Patent
Kim et al.

(10) Patent No.: US 6,441,944 B1
(45) Date of Patent: Aug. 27, 2002

(54) OPTICAL ATTENUATOR USING ISOLATOR AND OPTICAL COMMUNICATIONS SYSTEM INCLUDING THE SAME

(75) Inventors: Sung-jun Kim; Seong-taek Hwang, both of Pyeongtaek; Soo-young Yoon; Jeong-mee Kim, both of Yongin, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/208,018

(22) Filed: Dec. 9, 1998

(30) Foreign Application Priority Data

Dec. 9, 1997 (KR) .............................................. 97-67079

(51) Int. Cl.[7] .............................. G02F 1/09; G02F 1/01; G02B 6/00
(52) U.S. Cl. ........................ 359/281; 359/280; 359/238; 385/140
(58) Field of Search ................................ 359/238, 256, 359/280, 281, 282, 324, 484, 495, 497; 250/227.14; 324/244.1; 385/140

(56) References Cited

U.S. PATENT DOCUMENTS

| | | | | |
|---|---|---|---|---|
| 5,278,853 A | * | 1/1994 | Shirai et al. | 372/37 |
| 5,844,710 A | * | 12/1998 | Fukushima | 359/283 |
| 5,867,300 A | * | 2/1999 | Onaka et al. | 359/283 |
| 5,912,748 A | * | 6/1999 | Wu et al. | 359/117 |
| 5,973,821 A | * | 10/1999 | Onaka et al. | 359/283 |
| 6,014,254 A | * | 1/2000 | Cheng | 359/484 |
| 6,141,140 A | * | 10/2000 | Kim | 359/281 |
| 6,275,323 B1 | * | 8/2001 | Fukushima | 359/280 |

FOREIGN PATENT DOCUMENTS

| | | |
|---|---|---|
| EP | 0 717 302 A2 | 6/1995 |
| JP | 3-273208 | 12/1991 |

* cited by examiner

*Primary Examiner*—Georgia Epps
*Assistant Examiner*—Gary O'Neill
(74) *Attorney, Agent, or Firm*—Robert E. Bushnell, Esq.

(57) ABSTRACT

An optical attenuator using an isolator, and an optical communications system including the same, function to control the intensity of an input optical signal. The isolator comprises a Faraday rotator in which a rotation angle of polarization varies depending on the intensity of an applied magnetic field. As a result, the level of isolation of an optical signal changes in accordance with the rotation angle of polarization and an attenuated optical signal is outputted. A magnetic field generator generates a magnetic field having an intensity which is controlled by the intensity of current, and the generated magnetic field is applied to the isolator A power supply supplies current to the magnetic field generator and controls the intensity of the current. A magnetic core and a coil are installed on the optical isolator, and currents applied to the coil are controlled to adjust the intensity of the magnetic field which is formed on the isolator. Accordingly isolation of an optical signal is controlled, and the optical signal is attenuated. The optical attenuator is easily mounted on the system because of its small size, and can change the level of attenuation by controlling only the intensity of current.

18 Claims, 2 Drawing Sheets

OPTICAL ATTENUATOR USING ISOLATOR AND OPTICAL COMMUNICATIONS SYSTEM INCLUDING THE SAME

CLAIM OF PRIORITY

This application makes reference to, incorporates the same herein, and claims all benefits accruing under 35 U.S.C. §119 from an application entitled Optical Attenuator Using Isolator And Optical Communications System Including the Same earlier filed in the Korean Industrial Property Office on Dec. 9, 1997, and there duly assigned Ser. No. 97-67079 by that Office.

BACKGROUND OF THE INVENTION

1. Field of the Invention

The present invention relates to an optical attenuator using an isolator and an optical communications system including the same. More particularly, the invention relates to an optical attenuator for attenuating an optical beam by imposing a magnetic field change on an isolator, and an optical communications system including the same.

2. Related Art

In optical communications, an optical attenuator is widely employed. The optical attenuator is an important element in various optical components. In particular, when a signal entering via a receiving port during optical transmission is so strong as to go beyond the sensitivity of a detector, the intensity of a signal light can be controlled in accordance with a reception sensing range by including an attenuator.

Typically, an optical attenuator employs an attenuation plate having an attenuation level which varies depending on an angle of rotation thereof. Thus, such optical attenuators require a special motor to rotate the attenuation plate. As a result, the optical attenuator is necessarily large in size and expensive to fabricate. Moreover, the large size of such an optical attenuator prevents it from being easily mounted on or in an optical communications system. Thus, a special mounting device is required, and this further increases the cost of construction of the system.

SUMMARY OF THE INVENTION

To solve the above problems, it is an object of the present invention to provide an optical attenuator using an isolator, which can electromagnetically control the attenuation level of the attenuator by controlling the isolation level dependent upon the intensity of a magnetic field applied to the isolator, and an optical communications system including the same.

To achieve the above object, there is provided an optical attenuator using an isolator, which is controls the intensity of an input optical signal. The optical attenuator comprise: an isolator, including a Faraday rotator, in which a polarization rotation angle varies depending on the intensity of an applied magnetic field so as to change the level of isolation of an optical signal according to the polarization rotation angle and to output an attenuated optical signal; a magnetic field generator for generating a magnetic field having an intensity which is controlled by the intensity of current, and applying the generated magnetic field to the isolator; and a power supply for supplying current to the magnetic field generator and for controlling the intensity of the current.

To achieve the above object, there is provided an optical communications system which includes an optical transmitter, first and second optical attenuators, and an optical receiver. Damage to the optical receiver is prevented by controlling the power of an output optical signal of the optical transmitter using the first optical attenuator, and controlling the power of an optical signal to be received by the optical receiver using the second optical attenuator. The first or second optical attenuator comprises: an isolator, including a Faraday rotator, in which a polarization rotation angle varies depending on the intensity of an applied magnetic field so as to change the level of isolation of an optical signal according to the polarization rotation angle and to output an attenuated optical signal; a magnetic field generator for generating a magnetic field having an intensity which is controlled by the intensity of current, the generated magnetic field being applied to the isolator; and a power supply for supplying current to the magnetic field generator and for controlling the intensity of the current.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
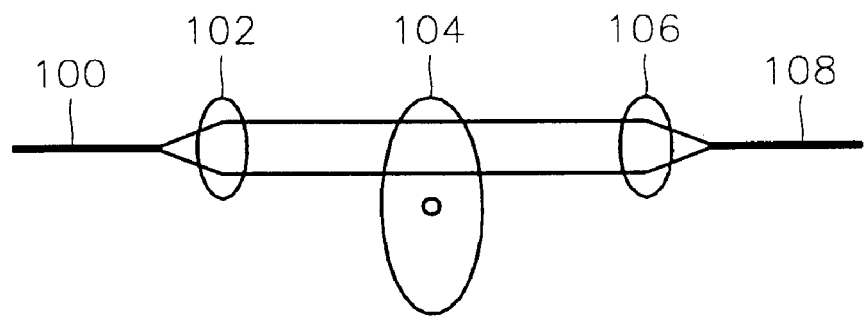
FIG. 1 shows the configuration of an optical attenuator.

FIG. 1 is a block diagram illustrating the configuration of an optical attenuator. Referring to FIG. 1, the optical attenuator comprises a first optical fiber 100, a first lens 102, an attenuation plate 104, a second lens 106, and a second optical fiber 108.

First, an input signal light dispersed from the first optical fiber 100 is rendered into parallel light beams via the first lens 102 and is incident upon the attenuation plate 104. The attenuation plate 104 is coated at different attenuation levels depending on its position, and has different attenuation levels according to an angle of rotation. The light signal passed through the attenuation plate 104 is focused by the second lens 106, and is then outputted to the second optical fiber 108.

However, a special motor for rotating the attenuation plate 104 is required to automatically control the attenuation plate 104. In this case, the attenuator becomes large, and its cost increases. Particularly, when the attenuator must be mounted on a system such as an exchanger, direct mounting on a rack is difficult because of the size of the attenuator, and this requires a special mounting device.

Figure 2:
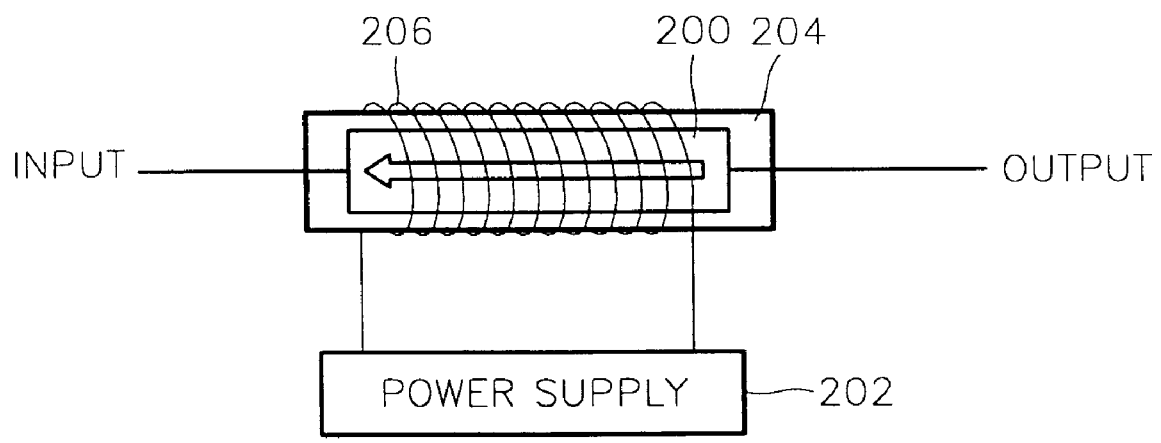
FIG. 2 is a block diagram of an optical attenuator using an isolator according to the present invention.

Referring to FIG. 2, an optical attenuator includes an electromagnet which forms a magnetic field using a magnetic core 204 and a coil 206, the magnetic field being imposed on an isolator 200. A power supply 202 is connected to and supplies current to the coil 206. The magnetic core 204 functions to increase a magnetic flux caused by the coil 206.

The operation of the present invention will now be described based on the above-described configuration. First, an input optical signal enters via an optical fiber input end (not shown), and is blocked by the isolator 200. An electrical signal generated by a power supply 202 controls the isolation level of the isolator 200 by changing the magnetic field of the coil 206. The isolation level can be considered to be the attenuation of an output optical signal relative to the input optical signal. That is, while the electrical signal generated by the power supply 202 is applied to the magnetic core 204 and the coil 206, an input optical signal incident upon the isolator 200 is attenuated according to the level of attenuation of the isolator 200.

In the optical attenuator operating as described above, the extinction ratio is, preferably, between 0.5 dB and 50 dB.

Figure 3:
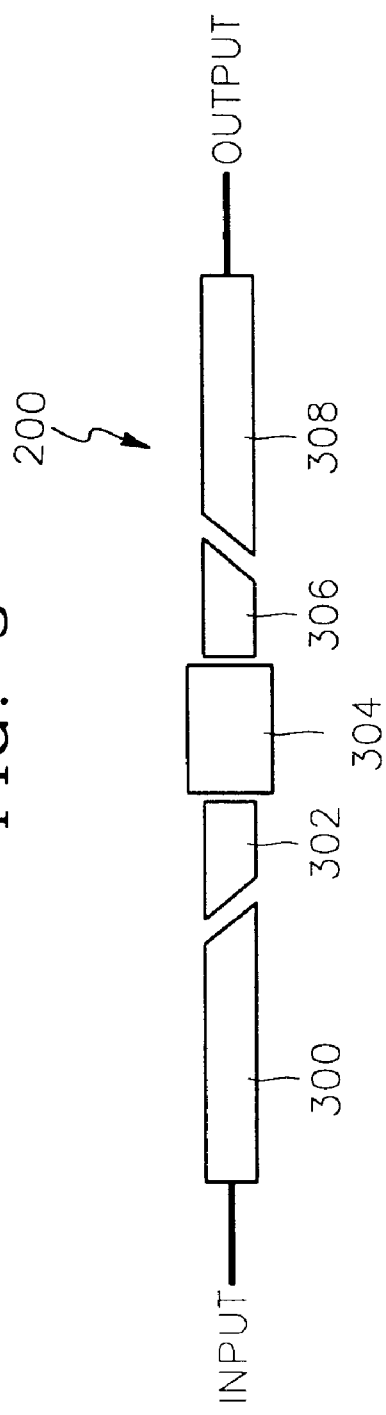
FIG. 3 is a block diagram of the isolator of FIG. 2.

FIG. 3 is a block diagram of the isolator 200 of FIG. 2. The isolator 200 allows light to be transmitted from an input projection port to an output port with low loss, and prevents reverse traveling and recombination of light with high loss, thus maintaining stable operation of the system. For example, when light emitted by a laser diode travels in a light transmission direction, reflected light is generated in a connecter where optical fibers are spliced to each other, or where reflective noise is generated due to light traveling backward when connected to various other devices. The isolator prevents the above problems, and is particularly necessary in optical communications of no less than 1 Gbps speed with a high sensitivity sensor where problems are generated by reflected light.

The isolator 200 of FIG. 3 includes a first collimator 300, a first double refraction element 302, a Faraday rotator 304, a second double refraction element 306, and a second collimator 308. Rutile or calcite is suitable as the materials of the double refraction elements 302 and 306. The first double refraction element 302 operates as a polarizer, and the second double refraction element 306 operates as an analyzer. The principle is that only a particular light polarized in one direction passes, and polarized light perpendicular to the above polarized light does not pass. The essential parameter between the polarizer and the analyzer is the extinction ratio of the passing polarized light to the polarized light that is perpendicular to the passing polarized light.

The Faraday rotator 304 rotates the polarization plane of incident light by 45°. The light rotated by 45° is reflected in a reverse direction by the rear end of the Faraday rotator 304, reenters it, and is then rotated by 45° again. Thus, the light is rotated by a total of 90°. Accordingly, the reflected wave rotated by 90° is blocked by the polarizer. The Faraday rotator 304 generates a Faraday rotation by a Faraday effect when a magnetic field is applied to magneto-optic material in a traveling direction. The Faraday effect is such that the polarization plane of light rotates while the light passes through magneto-optic material.

The performance of the isolator 200 is determined by forward insertion loss and backward isolation. The isolator usually has insertion loss of about 1 dB and isolation of about 30 dB due to reflection at an element junction, a defective polarizer and a defective rotator.

Figure 4:
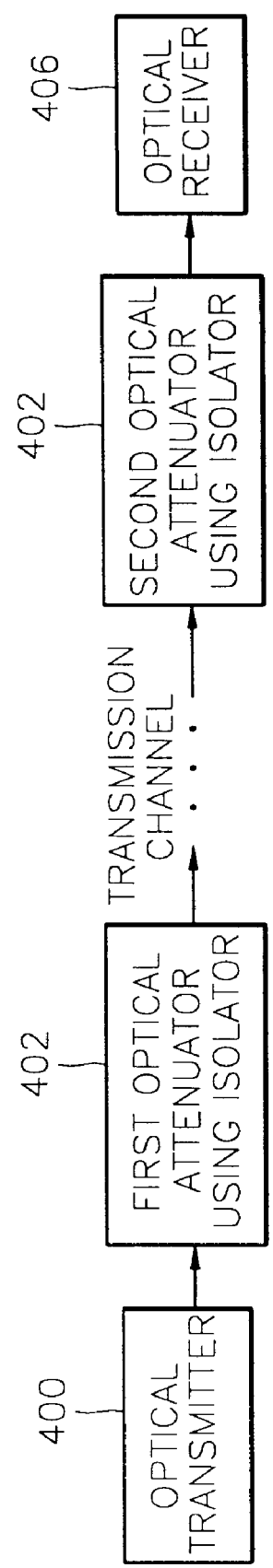
FIG. 4 is a block diagram of an optical communications system including an optical attenuator using an isolator according to the present invention.

The operation of the isolator 200 of FIG. 3 will now be described. The first collimator 300 collects and collimates light emitted by a first optical fiber or a laser diode (not shown). The collimated light is divided by the first double refraction element 302 into two beams having polarized directions which are perpendicular to each other. The two beams pass through different FIG. 4 is a block diagram of an optical communications system including an optical attenuator using an isolator according to the present invention. Referring to FIG. 4, the optical communications system includes an optical transmitter 400, a first optical attenuator 402 using an isolator, a second optical attenuator 404 using an isolator, and an optical receiver 406.

The power of an optical signal incident upon the optical transmitter 400 is adjusted by the first optical attenuator 402 to supply output power required by the system. A strong optical signal is transmitted to the second optical attenuator 404 via a transmission channel, and is attenuated by the optical attenuator 404 to prevent damage to the optical receiver 406.

As to transmission of a wavelength division multiplexed (WDM) optical signal, the optical attenuator using an isolator controls the power of light when adding or dropping of a channel is conducted in an optical transmitter and receiver and in an optical add/drop multiplexer.

According to the present invention, a magnetic core and a coil are installed on an optical isolator, and currents to be applied to the coil are controlled to adjust the intensity of a magnetic field formed on the isolator. Accordingly, the isolation of an optical signal is controlled. In this way, the optical signal is attenuated. Therefore, an optical attenuator which is easily mounted on a system by virtue of its small size is obtained. Moreover, such an optical attenuator is not sensitive to external factors such as dust, temperature and humidity since the level of attenuation can be changed by controlling only the intensity of current. Also, interface of the optical attenuator with the system is easily achieved since currents are electrically controlled rather than mechanically controlled, using a motor to rotate an optical attenuator plate.

It should be understood that the present invention is not limited to the particular embodiment disclosed herein as the best mode contemplated for carrying out the present invention, but rather that paths, and are incident upon the Faraday rotator 304. Rutile or calcite is suitable for the materials of the double refraction elements 302 and 306. The light entering the Faraday rotator 304 is rotated by 45° in existing polarized light directions, while the polarized directions are kept perpendicular to each other. When the polarization direction-changed beams again pass through the second double refraction element 306, the two beams are united into one. Then, the two beams are collimated by the second collimator 308, and the collimated beam enters a second optical fiber (not shown). The Faraday rotator 304 allows the isolator to maintain a constant magnetic field so that polarization can be changed by 45°. However, if a magnetic field is generated in the vicinity of the isolator 200, the magnetic field of a magnet comprising the Faraday rotator 304 is affected. Also, the Faraday rotator 304 changes the rotation angle of polarization according to the intensity of the magnetic field as represented by the following Equation 1:

$$\theta = VBl \tag{1}$$

wherein θ is a rotation angle, V is a constant, B is the intensity of a magnetic field, and l is an interaction length.

When polarization is changed by an external magnetic field as represented in Equation 1, the paths of light beams polarized perpendicular to each other by the second double refraction element 306 are changed, which consequently changes the amount of light incident upon the second optical fiber (not shown) via the second collimator 308. That is, the intensity of the magnetic field varies with the intensity of an external electric signal (current), and the loss characteristic of the isolator 200 differs depending on the variation of the magnetic field intensity. the present invention is not limited to the specific embodiments described in this specification except as defined in the appended claims.

What is claimed is:

1. An optical attenuator for controlling an intensity of an input optical signal, said optical attenuator comprising:

an isolator including a Faraday rotator in which a rotation angle of polarization varies depending on an intensity of an applied magnetic field, said isolator changing a level of isolation of an optical signal according to the rotation angle of polarization and outputting an attenuated optical signal;

a magnetic field generator for generating a magnetic field having an intensity controlled by an intensity of current, and for applying the generated magnetic field to said isolator; and a power supply for supplying current to said magnetic field generator, and for controlling the intensity of the current supplied to said magnetic field generator;

wherein said isolator includes collimator means for receiving and collimating the optical signal, and double refracting means for splitting said received and collimated optical signal into two optical signal outputs having different polarizations, said two optical signal outputs being provided as an input to said Faraday rotator.

2. The optical attenuator of claim 1, wherein the magnetic field generating means comprises:

a coil which generates a magnetic flux; and a magnetic core positioned inside the coil for increasing the magnetic flux.

3. The optical attenuator of claim 1, wherein said isolator further includes additional double refracting means connected to outputs of said Faraday rotator for forming a single optical output from said outputs of said Faraday rotator, and additional collimator means for receiving said single optical output and providing said attenuated optical signal.

4. An optical attenuator for controlling an intensity of an input optical signal, said optical attenuator comprising:

an isolator including a Faraday rotator in which a rotation angle of polarization varies depending on an intensity of an applied magnetic field, said isolator changing a level of isolation of an optical signal according to the rotation angle of polarization and outputting an attenuated optical signal;

a magnetic field generator for generating a magnetic field having an intensity controlled by an intensity of current, and for applying the generated magnetic field to said isolator; and a power supply for supplying current to said magnetic field generator, and for controlling the intensity of the current supplied to said magnetic field generator;

wherein said isolator further includes double refracting means connected to outputs of said Faraday rotator for forming a single optical output from said outputs of said Faraday rotator, and collimator means for receiving said single optical output and providing said attenuated optical signal.

5. The optical attenuator of claim 4, wherein the magnetic field generating means comprises:

a coil which generates a magnetic flux; and a magnetic core positioned inside the coil for increasing the magnetic flux.

6. An optical communications system, including an optical transmitter, first and second optical attenuators, and an optical receiver, for preventing damage to the optical receiver by controlling a power of an output optical signal of the optical transmitter using the first optical attenuator, and by controlling a power of an optical signal to be received by the optical receiver using the second optical attenuator, wherein at least one of the first and second optical attenuator comprises:

an isolator including a Faraday rotator in which a polarization rotation angle varies depending on an intensity of an applied magnetic field, said isolator changing a level of isolation of an optical signal according to the polarization rotation angle and outputting an attenuated optical signal;

a magnetic field generator for generating a magnetic field having an intensity which is controlled by an intensity of current, and applying the generated magnetic field to the isolator; and a power supply for supplying a current to the magnetic field generator and controlling the intensity of the current.

7. The system of claim 6, wherein said isolator includes collimator means for receiving and collimating the optical signal, and double refracting means for splitting said received and collimated optical signal into two optical signal outputs having different polarizations, said two optical signal outputs being provided as an input to said Faraday rotator.

8. The system of claim 7, wherein said isolator further includes additional double refracting means connected to outputs of said Faraday rotator for forming a single optical output from said outputs of said Faraday rotator, and additional collimator means for receiving said single optical output and providing said attenuated optical signal.

9. The system of claim 6, wherein said isolator further includes double refracting means connected to outputs of said Faraday rotator for forming a single optical output from said outputs of said Faraday rotator, and collimator means for receiving said single optical output and providing said attenuated optical signal.

10. An optical attenuator for controlling an intensity of an optical signal input, comprising:

power supply means for supplying a current and controlling an intensity thereof;

magnetic field generating means responsive to the current supplied by said power supply means for generating a magnetic field having an intensity corresponding to the intensity of the current supplied by said power supply means; and isolator means responsive to the magnetic field generated by said magnetic field generating means for varying a rotation angle of polarization in dependence on the intensity of the magnetic field generated by said magnetic field generating means so as to change a level of isolation of an optical signal in accordance with the rotation angle of polarization, thereby producing an attenuated optical signal;

wherein said isolator means includes a collimator for receiving and collimating the optical signal, and a double refractor for splitting said received and collimated optical signal into two optical signal outputs having different polarizations.

11. The optical attenuator of claim 10, wherein the magnetic field generating means comprises:

a coil which generates a magnetic flux; and a magnetic core positioned inside the coil for increasing the magnetic flux.

12. The optical attenuator of claim 10, said two optical signal outputs being provided as an input to a Faraday rotator.

13. The optical attenuator of claim 10, wherein said isolator means further includes an additional double refractor connected to outputs of said Faraday rotator for forming a single optical output from said outputs of said Faraday rotator, and an additional collimator for receiving said single optical output and providing said attenuated optical signal.

14. An optical attenuator for controlling an intensity of an optical signal input, comprising:

power supply means for supplying a current and controlling an intensity thereof;

magnetic field generating means responsive to the current supplied by said power supply means for generating a magnetic field having an intensity corresponding to the intensity of the current supplied by said power supply means; and isolator means responsive to the magnetic field generated by said magnetic field generating means for varying a rotation angle of polarization in dependence on the intensity of the magnetic field generated by said magnetic field generating means so as to change a level of isolation of an optical signal in accordance with the rotation angle of polarization, thereby producing an attenuated optical signal;

wherein said isolator means further includes a double refractor connected to outputs of said Faraday rotator for forming a single optical output from said outputs of said Faraday rotator, and a collimator for receiving said single optical output and providing said attenuated optical signal.

15. The optical attenuator of claim 14, wherein the magnetic field generating means comprises:

a coil which generates a magnetic flux; and a magnetic core positioned inside the coil for increasing the magnetic flux.

16. An optical communications system comprising at least one optical attenuator for controlling an intensity of an optical signal input, said at least one optical attenuator comprising:

power supply means for supplying a current and controlling an intensity thereof;

magnetic field generating means responsive to the current supplied by said power supply means for generating a magnetic field having an intensity corresponding to the intensity of the current supplied by said power supply means; and isolator means responsive to the magnetic field generated by said magnetic field generating means for varying a rotation angle of polarization in dependence on the intensity of the magnetic field generated by said magnetic field generating means so as to change a level of isolation of an optical signal in accordance with the rotation angle of polarization, thereby producing an attenuated optical signal;

said system further comprising an optical transmitter and an optical receiver, said at least one optical attenuator preventing damage to said optical receiver by controlling a power of an optical signal output of said optical transmitter.

17. An optical communications system comprising at least one optical attenuator for controlling an intensity of an optical signal input, said at least one optical attenuator comprising:

power supply means for supplying a current and controlling an intensity thereof;

magnetic field generating means responsive to the current supplied by said power supply means for generating a magnetic field having an intensity corresponding to the intensity of the current supplied by said power supply means; and isolator means responsive to the magnetic field generated by said magnetic field generating means for varying a rotation angle of polarization in dependence on the intensity of the magnetic field generated by said magnetic field generating means so as to change a level of isolation of an optical signal in accordance with the rotation angle of polarization, thereby producing an attenuated optical signal;

said system further comprising an optical transmitter and an optical receiver, said at least one optical attenuator preventing damage to said optical receiver by controlling a power of an optical signal input of said optical receiver.

18. An optical communications system comprising at least one optical attenuator for controlling an intensity of an optical signal input, said at least one optical attenuator comprising:

power supply means for supplying a current and controlling an intensity thereof;

magnetic field generating means responsive to the current supplied by said power supply means for generating a magnetic field having an intensity corresponding to the intensity of the current supplied by said power supply means; and isolator means responsive to the magnetic field generated by said magnetic field generating means for varying a rotation angle of polarization in dependence on the intensity of the magnetic field generated by said magnetic field generating means so as to change a level of isolation of an optical signal in accordance with the rotation angle of polarization, thereby producing an attenuated optical signal;

said system further comprising an optical transmitter and an optical receiver, said at least one optical attenuator comprising a first optical attenuator for preventing damage to said optical receiver by controlling a power of an optical signal output of said optical transmitter, and a second optical attenuator for preventing damage to said optical receiver by controlling a power of an optical signal input to said optical receiver.

* * * * *